United States Patent
Carnevale

(10) Patent No.: US 9,923,229 B2
(45) Date of Patent: Mar. 20, 2018

(54) BAFFLE FOR USE IN A FUEL CELL MANIFOLD

(71) Applicant: Audi AG, Ingolstadt (DE)

(72) Inventor: Christopher John Carnevale, Vernon, CT (US)

(73) Assignee: Audi AG, Ingolstadt (DE)

( * ) Notice: Subject to any disclaimer, the term of this patent is extended or adjusted under 35 U.S.C. 154(b) by 36 days.

(21) Appl. No.: 15/025,199

(22) PCT Filed: Sep. 30, 2013

(86) PCT No.: PCT/US2013/062572
§ 371 (c)(1),
(2) Date: Mar. 25, 2016

(87) PCT Pub. No.: WO2015/047379
PCT Pub. Date: Apr. 2, 2015

(65) Prior Publication Data
US 2016/0233538 A1    Aug. 11, 2016

(51) Int. Cl.
| | |
|---|---|
| *H01M 8/02* | (2016.01) |
| *H01M 8/2484* | (2016.01) |
| *H01M 8/241* | (2016.01) |
| *H01M 8/026* | (2016.01) |
| *H01M 8/04089* | (2016.01) |
| *H01M 8/04082* | (2016.01) |

(52) U.S. Cl.
CPC ......... *H01M 8/2484* (2016.02); *H01M 8/026* (2013.01); *H01M 8/04089* (2013.01); *H01M 8/04201* (2013.01); *H01M 8/2415* (2013.01)

(58) Field of Classification Search
CPC ...................................................... H01M 8/00
See application file for complete search history.

(56) References Cited

U.S. PATENT DOCUMENTS

| | | |
|---|---|---|
| 4,670,361 A | 6/1987 | Tsutsumi et al. |
| 2006/0060244 A1 | 3/2006 | Eggum et al. |
| 2008/0008916 A1* | 1/2008 | Shin ...................... H01M 8/026 429/435 |
| 2010/0227234 A1 | 9/2010 | Ma et al. |
| 2011/0281190 A1 | 11/2011 | Skinkle |
| 2012/0196202 A1 | 8/2012 | McInerney et al. |
| 2012/0202132 A1 | 8/2012 | Bogumil et al. |

FOREIGN PATENT DOCUMENTS

WO    2010/056231 A1    5/2010

* cited by examiner

*Primary Examiner* — Jacob Marks
(74) *Attorney, Agent, or Firm* — Seed Intellectual Property Law Group LLP

(57) ABSTRACT

According to an embodiment, an assembly for use in a fuel cell includes a manifold having at least one inlet and at least one surface configured to facilitate fluid flow from the inlet along a direction in the manifold. A baffle is situated generally parallel to the direction of flow. The baffle has a first portion, a second portion and a third portion. The first portion is closer to the inlet than the second portion. The second portion is closer to the inlet than the third portion. The first portion has a first width situated generally perpendicular to the flow direction. The second portion has a second width situated generally perpendicular to the flow direction. The second width is less than the first width. The third portion has a third width situated generally perpendicular to the flow direction. The third width is greater than the second width.

20 Claims, 2 Drawing Sheets

BAFFLE FOR USE IN A FUEL CELL MANIFOLD

STATEMENT REGARDING FEDERALLY SPONSORED RESEARCH OR DEVELOPMENT

This invention was made with government support under Contract No. CA-04-7003-00 awarded by The Department of Transportation. The Government therefore has certain rights in this invention.

BACKGROUND

Fuel cells are useful for generating electricity based on an electrochemical reaction. Reactants, such as hydrogen and oxygen, are supplied to the fuel cell using a manifold, for example. One of the challenges associated with manifold design is how to adequately distribute the reactants to the various portions of a cell stack assembly.

For example, air, which is a source of oxygen, is typically supplied into a manifold at a relatively high velocity. The air entering the manifold tends to expand into an enlarged area just inside the manifold inlet. The high velocity of the air stream presents a challenge when attempting to evenly spread the air across the face of the cell stack assembly.

Evenly distributing reactants within a cell stack assembly contributes to increasing the fuel cell operational life and addressing different operating conditions. It is possible with uneven distribution to locally starve portions of a fuel cell stack assembly. The anode and cathode components require an adequate amount of reactant to perform in a desired manner.

Previous attempts at achieving appropriate reactant distribution from a manifold have tended toward adding different channels to the manifold, itself. These approaches introduce additional complexities into the manifold structure. In some cases, the additional manifold complexity does not result in a desired reactant distribution so that little benefit is obtained from the additional complexity

SUMMARY

According to an embodiment, an assembly for use in a fuel cell includes a manifold having at least one inlet and at least one surface configured to facilitate fluid flow from the inlet along a direction in the manifold. A baffle is situated generally parallel to the direction of flow. The baffle has a first portion, a second portion and a third portion. The first portion is closer to the inlet than the second portion. The second portion is closer to the inlet than the third portion. The first portion has a first width situated generally perpendicular to the flow direction. The second portion has a second width situated generally perpendicular to the flow direction. The second width is less than the first width. The third portion has a third width situated generally perpendicular to the flow direction. The third width is greater than the second width.

The various features and advantages of at least one disclosed embodiment will become apparent to those skilled in the art from the following detailed description. The drawings that accompany the detailed description can be briefly described as follows.

DETAILED DESCRIPTION

Figure 1:
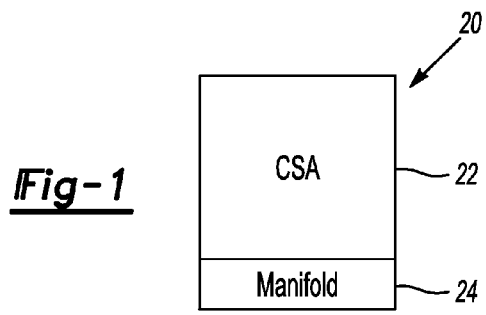
FIG. 1 schematically illustrates an example fuel cell assembly.

FIG. 1 schematically shows selected portions of an example fuel cell system 20. A cell stack assembly (CSA) 22 includes a plurality of individual fuel cell units that are configured in a known manner. Each fuel cell unit includes a cathode and an anode that facilitate an electrochemical reaction in a known manner for generating electricity. A manifold 24 is situated for providing a reactant, such as hydrogen or oxygen, to the fuel cell units within the CSA 22. For purposes of discussion, the manifold 24 will be considered as being used for supplying oxygen to the CSA 22. For discussion purposes, air flows into the manifold 24 as the source of oxygen for the CSA 22.

Figure 2:
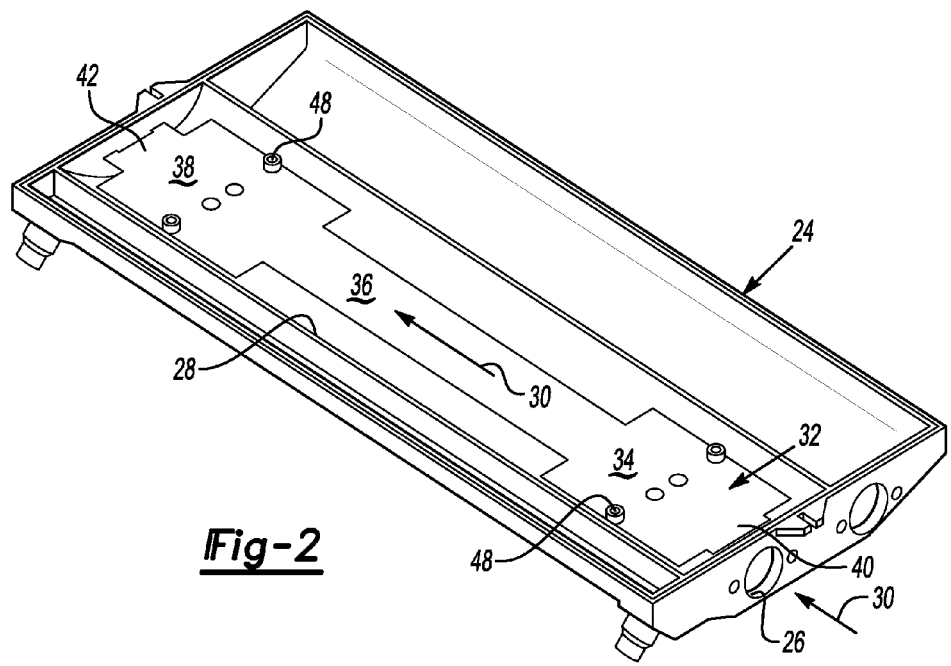
FIG. 2 is a perspective illustration of an example manifold and baffle configuration designed according to an embodiment of this invention.

FIG. 2 illustrates the manifold 24 separated from the CSA 22 such that an inside of the manifold 24 is visible. An inlet 26 is configured to be connected to an appropriately arranged conduit for directing air into the manifold 24. A surface 28 within the manifold 24 establishes a flow path along which the air flows as it enters the manifold 24. In FIG. 2 the airflow direction from the inlet 26 along the surface 28 is schematically shown by the arrows 30.

A baffle 32 is situated within the manifold 24 for distributing the airflow from the manifold 24 toward the CSA 22. The baffle 32 is configured to achieve a desired distribution of airflow to the individual fuel cell units of the CSA 22.

The baffle 32 includes a first portion 34 that is situated relatively near the inlet 26. A second portion 36 is on an opposite side of the first portion 34 from the inlet 26. A third portion 38 is further from the inlet 26 than the second portion 36.

Figure 3:
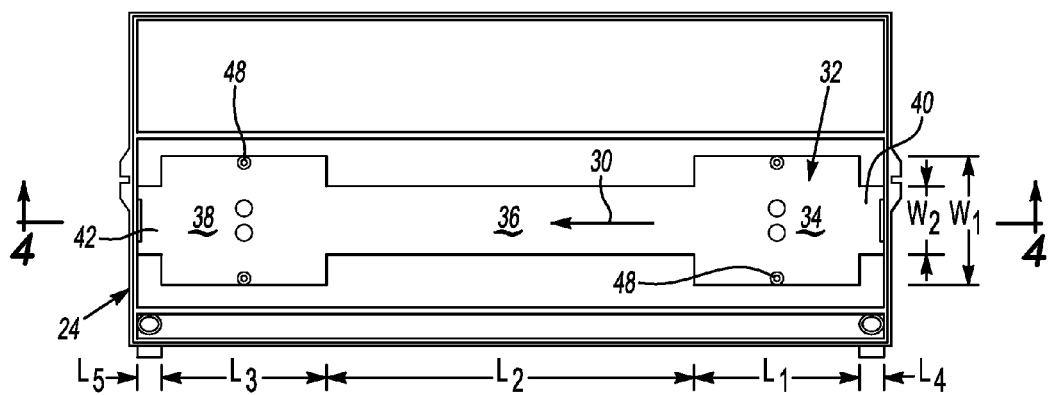
FIG. 3 is an elevational view of the example of FIG. 2.

As illustrated in FIG. 3, the first portion 34 has a first length $L_1$ and a first width $W_1$. The second portion 36 has a second length $L_2$ and second width $W_2$. In this example, the first length $L_1$ is smaller than the second length $L_2$. The first width $W_1$ is greater than the second width $W_2$. The third portion 38 has a third length $L_3$ and the same width as the first width $W_1$. In this example, the third length $L_3$ is the same as the first length $L_1$.

The different dimensions of the first portion 34, second portion 36 and third portion 38 facilitate more evenly distributing the fluid flow from the manifold 24 to the components of the CSA 22.

The example baffle includes a fourth portion 40 situated between the first portion 34 and the inlet 26. The fourth portion 40 in this example has the same width as the second width $W_2$ of the second portion 36. The fourth portion 40 has a length $L_4$ that is smaller than the first length $L_1$. A fifth portion 42 is situated near an opposite end of the baffle 32. The fifth portion 42 has a fifth length $L_5$ that is the same as the fourth length $L_4$ in this example. The fifth portion 42 has a width $W_2$ that is equal to the second width of the second portion 36.

The various portions of the baffle 32 establish different flow distribution regions through which the air that flows into the manifold 24 may pass as it moves toward the CSA 22.

Mounting members 48 facilitate securing the baffle 32 in a desired position within the manifold 24.

Figure 4:
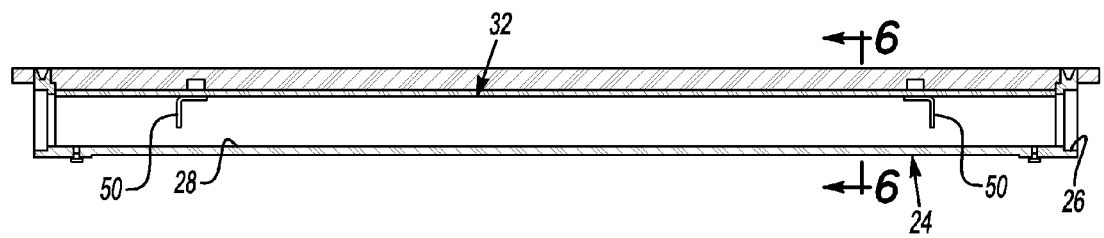
FIG. 4 is a cross-sectional illustration taken along the lines 4-4 in FIG. 3.

As shown in FIG. 4, the example baffle 32 includes deflectors 50 situated between the baffle 32 and the surface 28 within the manifold 24. The deflectors 50 establish a surface within the flow path of air flowing in the manifold 24. The surface of a deflector 50 is situated for deflecting or redirecting airflow within the manifold 24 in a manner that facilitates a desired fluid distribution toward the CSA 22. In the illustrated example, the deflectors 50 have a generally L-shaped cross-section or profile from the perspective shown in FIG. 4. The deflectors 50 are connected to one side of the baffle 32, which comprises a generally planar sheet in this example. In another example, the deflectors 50 are molded or otherwise formed as part of the baffle 32.

Figure 5:
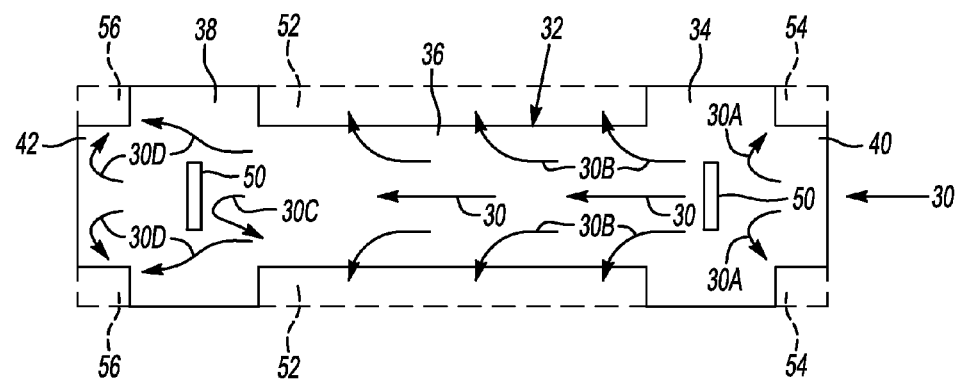
FIG. 5 schematically illustrates the example baffle configuration and associated fluid supply regions.

FIG. 5 schematically shows resulting fluid flow within the manifold provided by the baffle 32 including the deflectors 50. The flow direction along the surface 28 is schematically shown by the arrows 30. Some airflow entering the inlet 26 will encounter the deflector 50 that is situated on the first portion 34 of the baffle 32. As schematically shown by the arrows 30A, some airflow is deflected off the deflector 50 and redirected in a different direction than the flow direction 30. In this example, the airflow schematically shown at 30A tends to move toward the fourth portion 40 of the baffle 32. Much of the airflow as schematically shown at 30B tends to move into the region of the manifold corresponding to the second portion 36 of the baffle 32. Other airflow as schematically shown at 30C encounters another deflector 50, which is associated with the third portion 38 of the baffle 32. At least some of the airflow schematically shown at 30C tends to move back toward the second portion 36.

Additional airflow is schematically shown at 30D moving toward the fifth portion 42 of the baffle 32.

The different portions of the baffle 32 establish different fluid flow regions useful for distributing air to the CSA 22. In this example, the second portion 36 establishes fluid flow regions 52 on opposite sides of the second portion 36. The fluid flow regions 52 are schematically represented by the dashed lines and the edges of the baffle that establish a generally rectangular region in the illustration. The airflow at 30B, along with some of the airflow at 30C, tends to move through the fluid flow region 52 toward the CSA 22.

Another fluid distribution region is established at 54 by the fourth portion 40 of the baffle 32. As can be appreciated from the illustration, the fluid flow region 54 is smaller than the fluid flow region 52, which is the result of the different dimensions of the fourth portion 40 and the second portion 36 of the baffle 32, respectively. Another fluid distribution region 56 is established by the fifth portion 42 of the baffle 32.

The first portion 34 and the second portion 38 establish fluid supply regions that prevent fluid from moving away from the manifold surface 28 toward the CSA 22. The larger width $W_1$ of the first portion 34 and the third portion 38 compared to the other portions of the baffle 32 effectively blocks airflow from corresponding portions of the manifold 24 toward the CSA 22.

Figure 6:
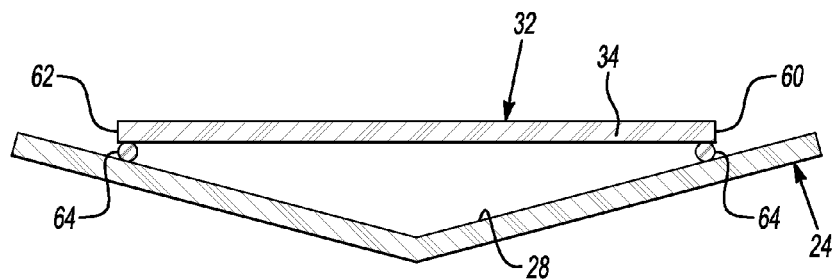
FIG. 6 is a partial cross-sectional illustration taken along the lines 6-6 in FIG. 4.

FIG. 6 schematically shows an arrangement in which an interface between the baffle 32 and the surface 28 within the manifold 24 includes a seal that prevents fluid flow toward the CSA 22 in the fluid supply regions corresponding to the first portion 34 and the third portion 38. In this example, the first portion 34 includes opposite edges 60 and 62 that are received adjacent the surface 28. In this particular example, seal members 64 are provided at the interface for sealing off that interface and preventing fluid flow toward the CSA 22 along that interface. The seal members 64 may be formed of separate pieces and a different material than that used for the baffle 32. In another example, the seal members 64 are formed as part of the first portion 34 and third portion 38 of the baffle 32. In still another example, a seal member is not provided and the surface along the edges 60 and 62 are received directly against the surface 28 within the manifold for closing off that interface against fluid flow toward the CSA 22.

The differently dimensioned portions of the baffle 32 facilitate distributing fluid flow from the manifold 24 toward the CSA 22 in a desired manner. Given the particular configuration of a manifold, the associated CSA and the fluid supply arrangement, those skilled in the art who have the benefit of this description will realize how to adjust or tune the different dimensions of the different portions of the baffle 32 to realize a desired fluid distribution to meet their particular needs. In one example, the baffle configuration provides for uniform flow among the fluid distribution regions 52, 54 and 56. According to one embodiment, such flow is considered uniform among the different fluid distribution portions if that flow is within a range of approximately a five percent difference among the different regions.

The preceding description is illustrative rather than limiting in nature. Variations and modifications to the disclosed example may become apparent to those skilled in the art that do not necessarily depart from the essence of the contribution to the art provided by the disclosed example. The scope of legal protection provided to the invention can only be determined by studying the following claims.

I claim:

1. An assembly for use in a fuel cell, comprising:
a manifold including at least one inlet and at least one surface configured to facilitate fluid flow from the inlet along a direction in the manifold; and
a baffle situated generally parallel to the direction, the baffle having a first portion, a second portion, and a third portion,
wherein
the first portion is closer to the inlet than the second portion,
the second portion is closer to the inlet than the third portion,
the first portion has a first width situated generally perpendicular to the direction,
the second portion has a second width situated generally perpendicular to the direction,
the second width is less than the first width,
the third portion has a third width situated generally perpendicular to the direction,
the third width is greater than the second width, and
the first portion and the third portion are situated relative to the manifold surface near opposite edges of the first portion and the third portion such that an interface between the manifold surface and the edges blocks fluid flow through the interface.

2. The assembly of claim 1, wherein
the first portion of the baffle has a first length that is perpendicular to the first width,
the second portion of the baffle has a second length that is perpendicular to the second width,
the third portion of the baffle has a third length that is perpendicular to the third width, the first length is less than the second length, and
the second length is greater than the third length.

3. The assembly of claim 2, wherein the first length is approximately equal to the third length and the first width is approximately equal to the third width.

4. The assembly of claim 1, wherein the baffle comprises a generally planar sheet.

5. The assembly of claim 4, wherein the baffle comprises at least one deflector situated between the generally planar sheet and the manifold surface where the at least one deflector is situated to redirect at least some fluid flow from moving along the direction to another direction.

6. An assembly for use in a fuel cell, comprising:
   a manifold including at least one inlet and at least one surface configured to facilitate fluid flow from the inlet along a direction in the manifold; and
   a baffle situated generally parallel to the direction, the baffle having a first portion, a second portion, and a third portion, and comprising:
      a generally planar sheet,
      at least one deflector situated between the generally planar sheet and the manifold surface where the at least one deflector is situated to redirect at least some fluid flow per QS from moving along the direction to another direction,
   wherein
      the first portion is closer to the inlet than the second portion,
      the second portion is closer to the inlet than the third portion,
      the first portion has a first width situated generally perpendicular to the direction,
      the second portion has a second width situated generally perpendicular to the direction,
      the second width is less than the first width,
      the third portion has a third width situated generally perpendicular to the direction,
      the third width is greater than the second width, and
      the at least one deflector redirects the at least some fluid flow to move in a direction that is generally perpendicular to the direction.

7. The assembly of claim 5, wherein the at least one deflector comprises a first deflector member situated on one side of the first portion of the baffle and a second deflector member situated on one side of the third portion of the baffle.

8. An assembly for use in a fuel cell, comprising:
   a manifold including at least one inlet and at least one surface configured to facilitate fluid flow from the inlet along a direction in the manifold; and
   a baffle situated generally parallel to the direction, the baffle having a first portion, a second portion, a third portion, and a fourth portion,
   wherein
      the first portion is closer to the inlet than the second portion,
      the second portion is closer to the inlet than the third portion,
      the first portion has a first width situated generally perpendicular to the direction,
      the second portion has a second width situated generally perpendicular to the direction,
      per QS the second width is less than the first width,
      the third portion has a third width situated generally perpendicular to the direction,
      the third width is greater than the second width, and
      the fourth portion is between the first portion of the baffle and the inlet of the manifold, the fourth portion having a fourth width that is less than the first width and a fourth length that is less than a first length of the first portion.

9. The assembly of claim 8, wherein
   the baffle comprises a fifth portion on an opposite side of the third portion from the second portion, the fifth portion having a fifth width that is less than the third width and a fifth length that is less than a third length of the third portion.

10. The assembly of claim 1, wherein
   the manifold has a length situated generally parallel to the direction; and
   the baffle has an overall length corresponding to the length of the manifold.

11. The assembly of claim 1, wherein the manifold has a width that is situated generally perpendicular to the direction and that is greater than each of the first width, the second width and the third width.

12. An assembly for use in a fuel cell comprising:
   a plurality of cell stack assembly components;
   a manifold including at least one inlet and at least one surface configured to facilitate fluid flow from the inlet along a direction in the manifold; and
   a baffle situated generally parallel to the direction, the baffle having a first portion, a second portion, and a third portion,
   wherein
      the first portion is closer to the inlet than the second portion;
      the second portion is closer to the inlet than the third portion;
      the first portion has a first width situated generally perpendicular to the direction;
      the second portion has a second width situated generally perpendicular to the direction;
      the second width is less than the first width;
      the third portion has a third width situated generally perpendicular to the direction;
      the third width is greater than the second width;
      the baffle is situated between the manifold surface and the cell stack assembly components;
      the first portion establishes a first fluid supply region to prevent fluid in the first fluid supply region from moving away from the manifold surface toward the cell stack assembly components;
      the second portion establishes a second fluid supply region including a fluid flow path from the manifold surface toward at least some of the cell stack assembly components; and
      the third portion establishes a third fluid supply region to prevent fluid in the third fluid supply region from moving away from the manifold surface toward the cell stack assembly components.

13. The assembly of claim 12, wherein
   the baffle comprises a fourth portion between the first portion and the inlet;
   the baffle comprises a fifth portion on a side of the third portion that is opposite from the second portion;
   the fourth portion establishes a fourth fluid supply region including a fluid flow path from the manifold surface toward at least some of the cell stack assembly components; and
   the fifth portion establishes a fifth fluid supply region including a fluid flow path from the manifold surface toward at least some of the cell stack assembly components.

14. The assembly of claim 13, wherein a flow capacity of the second fluid supply region is greater than a flow capacity of the fourth fluid supply region and a flow capacity of the fifth fluid supply region.

15. The assembly of claim 12, wherein the first portion includes two edges aligned parallel with the direction;
the edges of the first portion are received adjacent the manifold surface in a manner that prevents fluid flow between the edges and the manifold surface;
the third portion includes two edges aligned parallel with the direction; and
the edges of the third portion are received adjacent the surface of the manifold in a manner that prevents fluid flow between the edges and the manifold surface.

16. The assembly of claim 15, wherein an interface between each of the edges of the first and third portions and the manifold surface includes a seal.

17. The assembly of claim 16, wherein the seal is established by direct contact between the edges and the manifold surface.

18. The assembly of claim 16, comprising a seal member at the interfaces.

19. The assembly of claim 12, wherein the manifold surface has a generally V-shaped profile.

20. A fuel cell system comprising:
a plurality of cell stack assembly components;
a source that supplies fuel cell reactant;
a manifold including at least one inlet that is in fluid communication with the source that supplies the fuel cell reactant, the at least one inlet configured to receive the fuel cell reactant from the source, the manifold including at least one surface configured to facilitate fluid flow of the fuel cell reactant from the inlet along a direction in the manifold; and
a baffle situated generally parallel to the direction, the baffle having a first portion, a second portion, and a third portion,
wherein
the first portion is closer to the inlet than the second portion,
the second portion is closer to the inlet than the third portion,
the first portion has a first width situated generally perpendicular to the direction,
the second portion has a second width situated generally perpendicular to the direction,
the second width is less than the first width,
the third portion has a third width situated generally perpendicular to the direction, and
the third width is greater than the second width.

* * * * *

UNITED STATES PATENT AND TRADEMARK OFFICE
CERTIFICATE OF CORRECTION

PATENT NO. : 9,923,229 B2
APPLICATION NO. : 15/025199
DATED : March 20, 2018
INVENTOR(S) : Christopher John Carnevale It is certified that error appears in the above-identified patent and that said Letters Patent is hereby corrected as shown below:

In the Claims

Column 5, Line 24-25:
"fluid flow per QS from moving along the direction to another direction," should read, --fluid flow from moving along the direction to another direction,--.

Column 5, Line 62:
"per QS the second width is less than the first width," should read, --the second width is less than the first width,--.

Signed and Sealed this
Seventeenth Day of March, 2020

Andrei Iancu
*Director of the United States Patent and Trademark Office*